(12) United States Patent
Weng et al.

(10) Patent No.: US 8,469,248 B2
(45) Date of Patent: Jun. 25, 2013

(54) FASTENING DEVICE FOR BICYCLE

(75) Inventors: Jung-Hui Weng, Kaohsiung (TW);
Meng-Kuei Chou, Fongshan (TW);
Li-Jung Chang, Kaohsiung (TW)

(73) Assignee: Free Parable Design Co., Ltd.,
Kaohsiung (TW)

( * ) Notice: Subject to any disclaimer, the term of this patent is extended or adjusted under 35 U.S.C. 154(b) by 353 days.

(21) Appl. No.: 12/990,506

(22) PCT Filed: Dec. 23, 2009

(86) PCT No.: PCT/CN2009/075867
§ 371 (c)(1),
(2), (4) Date: Nov. 1, 2010

(87) PCT Pub. No.: WO2010/099690
PCT Pub. Date: Sep. 10, 2010

(65) Prior Publication Data
US 2011/0042435 A1    Feb. 24, 2011

(30) Foreign Application Priority Data

Mar. 3, 2009 (CN) .......................... 2009 1 0127406
Sep. 4, 2009 (CN) .......................... 2009 1 0173624

(51) Int. Cl.
*B62J 11/00* (2006.01)
*B62J 7/00* (2006.01)
*B62J 9/00* (2006.01)

(52) U.S. Cl.
USPC ........... 224/414; 224/431; 224/451; 224/460; 224/547

(58) Field of Classification Search
USPC ................. 224/430, 414, 429, 431, 459, 451, 224/454, 547
See application file for complete search history.

(56) References Cited

U.S. PATENT DOCUMENTS

| | | | | |
|---|---|---|---|---|
| 4,883,205 A | * | 11/1989 | Saelens et al. | 224/414 |
| 5,007,566 A | * | 4/1991 | Fick | 224/414 |
| 5,299,720 A | | 4/1994 | Koch, III | |
| 5,655,694 A | * | 8/1997 | Keckeisen | 224/430 |
| 6,053,384 A | * | 4/2000 | Bachman | 224/430 |
| 6,501,245 B2 | * | 12/2002 | Okuda | 320/112 |
| 6,932,255 B2 | * | 8/2005 | Van Houtte | 224/414 |
| 7,150,382 B2 | * | 12/2006 | Zickefoose | 224/423 |
| 2001/0042767 A1 | * | 11/2001 | Campagnolo | 224/414 |
| 2004/0256428 A1 | * | 12/2004 | Meggiolan | 224/414 |
| 2009/0145942 A1 | * | 6/2009 | Rice | 224/419 |

FOREIGN PATENT DOCUMENTS

| CN | 2384845 Y | 6/2000 |
|---|---|---|
| CN | 2732599 Y | 10/2005 |

(Continued)

*Primary Examiner* — Justin Larson
*Assistant Examiner* — Derek Battisti
(74) *Attorney, Agent, or Firm* — Cheng-Ju Chiang

(57) ABSTRACT

A fastening device for a bicycle includes a fixed assembly and a fastening assembly. The fixed assembly is fixedly mounted to the frame of the bicycle, and the fastening assembly is used for supporting an article. The first moveable socket and the second moveable socket of the fastening assembly are snapped into the first fixed holder and the second fixed holder of the fixed assembly correspondingly, so that the fastening assembly and the supported article are detachedly mounted to the frame of the bicycle. The fastening device for a bicycle can facilitate the disengaging and engaging of the article, prevent wear of the surface of the article, and enhance the fixing strength of the fastening assembly.

11 Claims, 14 Drawing Sheets

| | FOREIGN PATENT DOCUMENTS | | TW | M292525 U | 6/2006 |
|---|---|---|---|---|---|
| CN | 2880638 Y | 3/2007 | TW | M327319 U | 2/2008 |
| DE | 20316163 U1 | 2/2004 | | | |

* cited by examiner

FASTENING DEVICE FOR BICYCLE

CROSS REFERENCE TO RELATED APPLICATIONS

The present application is a 35 U.S.C. §371 National Phase conversion of International (PCT) Patent Application No. PCT/CN2009/075867, filed on Dec. 23, 2009, the disclosure of which is incorporated by reference herein. The PCT International Patent Application was published in Chinese.

FIELD OF THE INVENTION

The present invention relates to a fastening device for a bicycle, and more particularly to a fastening device for a bicycle having two fixed holders and two movable sockets correspondingly engaged with the two fixed holders for an object to be conveniently installed on or detached from a frame of the bicycle for enhancing the fastening strength.

BACKGROUND OF THE INVENTION

Nowadays, the bicycle has become a type of widely used vehicle and a type of most popular goods for sports and leisure activities. For a traditional bicycle, the bicycle is generally further installed or placed with an object on a frame thereof, for enhancing the function of the bicycle and the usage convenience of the object. Especially, a bottle cage can be installed on the frame without affecting riding, for placing a water bottle and conveniently taking it, so that a bicycle rider can take the water bottle for drinking.

Referring now to FIG. 1, an operational view of a traditional bottle cage of a bicycle is illustrated, wherein the bicycle comprises a frame 91, a bottle cage 92 and a water bottle 93. The frame 91 is formed with two screw holes 911. The bottle cage 92 is a hollow bent bracket with a substantial L-shape, and two screwing elements "a" are passed through two through holes (not shown) of the bottle cage 92 and the two screw holes 911, so that the bottle cage 92 can be screw-connected to the frame 91. The bottle cage 92 can suitably receive a water bottle 93 which is placed from top to bottom. The water bottle 93 is retained by the bottle cage 92 without being separated from the bottle cage 92, and the water bottle 93 can be optionally taken, placed and used by the bicycle rider.

However, there are still several disadvantages existing in the bottle cage 92 during actual operation, as follows: (1) the bottle cage 92 is directly in contact with the water bottle 93. When the water bottle 93 is taken and placed or is vibrated during riding the bicycle, the material or printing on the surface of the water bottle 93 is easily worn, so as to affect the texture and appearance of the water bottle 93; (2) when it is unnecessary to mount the water bottle 92 on the frame 91, the bottle cage 92 is still mounted on the frame 91, so as to affect the simplicity of the appearance of the bicycle; and (3) it is unsuitable for a foldable bicycle to install the bottle cage 92, because the bottle cage 92 will affect the foldable function of the foldable bicycle.

As a result, it is necessary to provide a fastening device for a bicycle to solve the problems existing in the traditional technology, as described above.

SUMMARY OF THE INVENTION

A primary object of the present invention is to provide a fastening device for a bicycle, wherein a first movable socket and a second movable socket of the fastening assembly can correspondingly engage with a first fixed holder and a second fixed holder of the fixed assembly, so that the fastening assembly and an object supported by the fastening assembly can be detachably mounted on the fixed assembly on the frame, while the fastening assembly is connected to and support the object by a connection element. Thus, it can prevent the surface of the object from being directly in contact with the frame and worn.

A secondary object of the present invention is to provide a fastening device for a bicycle, wherein the openings of the horseshoe-shape portions of the first movable socket and the second movable socket face different directions, so as to enhance the fastening strength of the fastening device for the bicycle.

A third object of the present invention is to provide a fastening device for a bicycle, wherein it can detach the fastening assembly and object from the fixed assembly, so as to maintain the simplicity of the appearance of the bicycle.

A fourth object of the present invention is to provide a fastening device for a bicycle, wherein the fastening assembly is suitably applied to a foldable bicycle, and the foldable bicycle can be normally folded when the fixed assembly doesn't support the fastening assembly and the object.

To achieve the above object, the present invention provides a fastening device for a bicycle which comprises a fixed assembly and a fastening assembly. The fixed assembly is mounted on a frame of the bicycle, and the fastening assembly is used to support an object. A first movable socket and a second movable socket of the fastening assembly can be correspondingly engaged with a first fixed holder and a second fixed holder of the fixed assembly, so that the fastening assembly and the object supported by the fastening assembly can be detachably mounted on the frame. The fastening device for the bicycle not only can provide the convenience for detaching the object and prevent the surface of the object from being worn, but also can enhance the fastening strength of the fastening assembly.

In one embodiment of the present invention, each of the first fixed holder and the second fixed holder has a profile of a pulley having a groove on a periphery of the pulley.

In one embodiment of the present invention, each of the first movable socket and the second movable socket has: a horseshoe-shape portion having an opening, and the horseshoe-shape portion used for correspondingly engaging into the groove of the first fixed holder or the second fixed holder; and two guiding portions formed on two ends of the opening of the horseshoe-shape portion for guiding the horseshoe-shape portion to engage into the groove of the first fixed holder or the second fixed holder.

In one embodiment of the present invention, two guiding extension portions are further formed between the horseshoe-shape portion and the guiding portions of the second movable socket for elongating a distance between the horseshoe-shape portion and the guiding portions.

In one embodiment of the present invention, the second movable socket comprises two flanges for inserting into the groove of the second fixed holder.

In one embodiment of the present invention, the opening of the horseshoe-shape portion of the first movable socket faces downward, and the opening of the horseshoe-shape portion of the second movable socket faces leftward or rightward.

In one embodiment of the present invention, the opening of the horseshoe-shape portion of the first movable socket faces downward, and the opening of the horseshoe-shape portion of the second movable socket faces downward.

In one embodiment of the present invention, the opening of the horseshoe-shape portion of the first movable socket faces upward, and the opening of the horseshoe-shape portion of the second movable socket faces downward.

In one embodiment of the present invention, an inner diameter of the horseshoe-shape portion of the first or second movable socket is substantially equal to a diameter of the groove of the first or second fixed holder, and a width of the opening of the horseshoe-shape portion is smaller than the inner diameter of the horseshoe-shape portion.

In one embodiment of the present invention, each of the first fixed holder and the second fixed holder further comprises a fixed washer disposed between each of the first and second fixed holders and the frame for filling a gap between each of the first and second fixed holders and a surface profile of the frame.

In one embodiment of the present invention, the fastening assembly is a container or a shelf.

In one embodiment of the present invention, the fastening assembly supports a water bottle, a tool box or a tool rack by a connection element, and the connection element is selected from a banding, a retaining ring or a pair of hook and loop fasteners.

In comparison with the traditional technology, the fixed assembly of the present invention is mounted on a frame of a bicycle, and the fastening device is used to support the object, so that the fastening assembly and the object supported by the fastening assembly can be detachably mounted on the frame. Thus, the fastening device for the bicycle not only can provide the convenience for detaching the object and prevent the surface of the object from being worn, but also can enhance the fastening strength of the fastening assembly.

DETAILED DESCRIPTION OF THE PREFERRED EMBODIMENTS

The structure and the technical means adopted by the present invention to achieve the above objects, characteristics and advantages can be best understood by referring to the following detailed description of the preferred embodiments and the accompanying drawings, wherein:

A fastening device for a bicycle according to the present invention can be selectively installed on a frame of a normal bicycle or a foldable bicycle for supporting an object, such as a water bottle, a tool box or a tool rack. However, the position of the bicycle for placing the object may be varied according to actual usage needs, but the present invention is not limited thereto. The directional terms, such as upper, lower, left and right, disclosed by the present invention hereinafter is corresponding to the direction relationship of a frame of a normal bicycle in relation to the ground and the front end or the rear end of the bicycle under a normal operation status, without considering the inclination angle of the frame, wherein the foregoing relative directional terms are only used to explain the arrangement relationship between elements of the present invention, but the present invention is not limited thereto.

Figure 1:
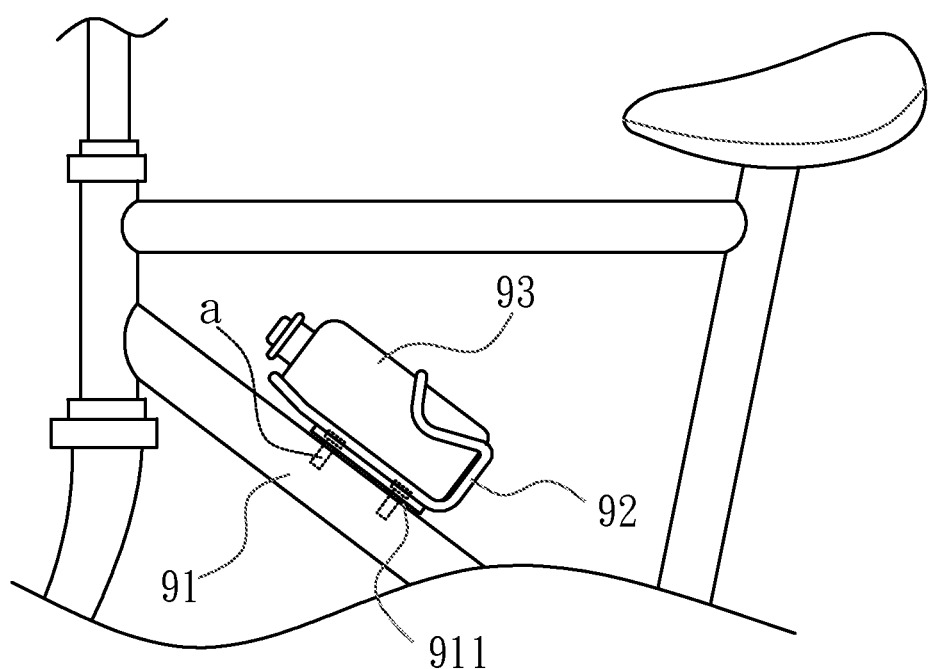
FIG. 1 is an operational view of a traditional bottle cage of a bicycle.
Figure 2:
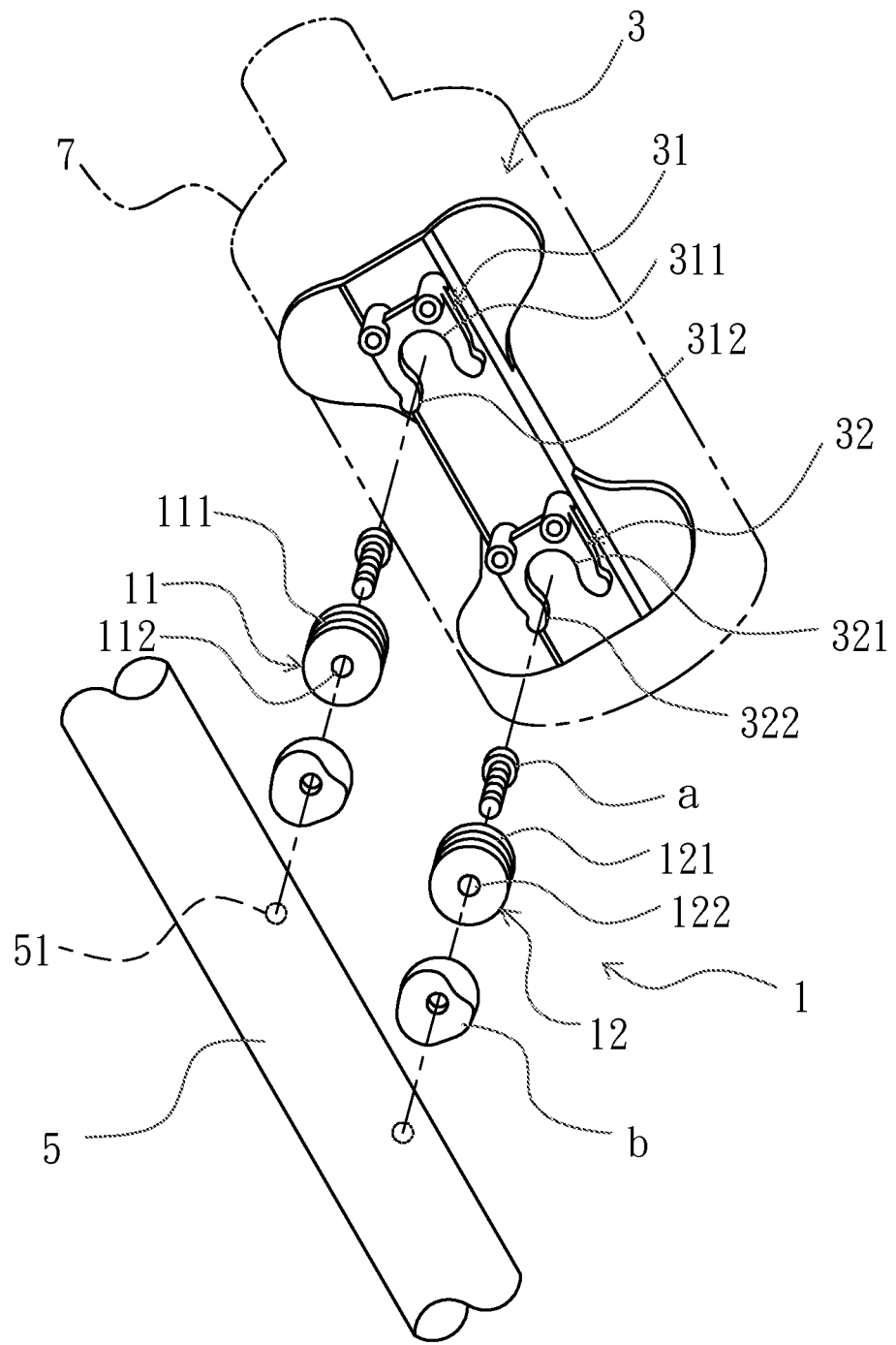
FIG. 2 is an exploded perspective view of a fastening device for a bicycle according to a first embodiment of the present invention.

Referring now to FIG. 2, an exploded perspective view of a fastening device for a bicycle according to a first embodiment of the present invention is illustrated, wherein the fastening device for the bicycle comprises a fixed assembly 1 and a fastening assembly 3. The fixed assembly 1 includes a first fixed holder 11 and a second fixed holder 12, while the fastening assembly 3 includes a first movable socket 31 and a second movable socket 32. The fastening assembly 3 is used to support an object 7, such as a water bottle.

Referring to FIG. 2, in the first embodiment of the present invention, the first fixed holder 11 of the fixed assembly 1 has a profile of a pulley having a groove 111 on a periphery of the pulley. Further, the center of the first fixed holder 11 is formed with a through hole 112, wherein the first fixed holder 11 can be screw-connected to a screw hole 51 of the frame 5 by a screwing element "a". In the embodiment, the second fixed holder 12 and the first fixed holder 11 of the fixed assembly 1 have the same profile, and the second fixed holder 12 has a groove 121 on a periphery thereof. The center of the second fixed holder 12 is formed with a through hole 122, wherein the second fixed holder 12 can be screw-connected to a screw hole 51 of the frame 5 by a screwing element "a". The first fixed holder 11 and the second fixed holder 12 is apart from each other a suitable distance.

Referring to FIG. 2, in the first embodiment of the present invention, the first movable socket 31 of the fastening assembly 3 has a horseshoe-shape portion 311 and two guiding portions 312, wherein the horseshoe-shape portion 311 is a horseshoe-shape socket structure similar to "Q" shape, and has an opening on one side thereof. An inner diameter of the horseshoe-shape portion 311 is substantially equal to a diameter of the groove 111 of the first fixed holder 11, and a width of the opening of the horseshoe-shape portion 311 is smaller than the inner diameter of the horseshoe-shape portion 311. The two guiding portions 312 are formed on two ends of the opening of the horseshoe-shape portion 311. The horseshoe-shape portion 311 of the first movable socket 31 can correspondingly engage into the groove 111 of the first fixed holder 11 of the fixed assembly 1, wherein the two guiding portions 312 are used for guiding the horseshoe-shape portion 311 to smoothly engage into the groove 111. In the embodiment, the second movable socket 32 and the first movable socket 31 of the fastening assembly 3 have the same profile, wherein the second movable socket 32 also has a horseshoe-shape portion 321 and two guiding portions 322. The horseshoe-shape portion 321 is a horseshoe-shape socket structure similar to "Q" shape, and has an opening on one side thereof. The two guiding portions 322 are formed on two ends of the opening of the horseshoe-shape portion 321. The horseshoe-shape portion 321 of the second movable socket 32 can correspondingly engage into the groove 121 of the second fixed holder 12 of the fixed assembly 1, wherein the two guiding portions 322 are used for guiding the horseshoe-shape portion 321 to smoothly engage into the groove 121.

Referring to FIG. 2, in the first embodiment of the present invention, the first fixed holder 11 and the second fixed holder 12 are preferably made of abrasion-proof tough material, such as metal or engineering plastic. The first fixed holder 11 and the second fixed holder 12 further comprises two fixed washers "b", wherein one of the fixed washers "b" is disposed between the first fixed holder 11 and the frame 5, and the other of the fixed washers "b" is disposed between the second fixed holder 12 and the frame 5. Because the surface profile of a frame 5 is generally circular or elliptical, the fixed washers "b" can correspondingly fill a gap between each of the first and second fixed holders 11, 12 and the surface profile of the frame 5. Thus, it can prevent edges of the first and second fixed holders 11, 12 from being impacted and damaged, and can provide an aesthetic effect.

Referring to FIG. 2, in the first embodiment of the present invention, although the first fixed holder 11 and the second fixed holder 12 are mounted on the frame 5 by the screwing element "b", the present invention is not limited thereto. For example, the first fixed holder 11 and the second fixed holder 12 can be mounted on the frame 5 by a banding, a retaining ring or welding.

As described above, the fastening assembly 3 is used to support an object 7. In the first embodiment of the present invention, the fastening device for the bicycle discloses that the fastening assembly 3 is connected to a water bottle, but the present invention is not limited thereto. For example, the fastening assembly 3 can be connected to a receiving container (such as a tool box) or a rack (such as a too rack). Alternatively, the fastening assembly 3 is a container or a shelf itself.

Figure 3A:
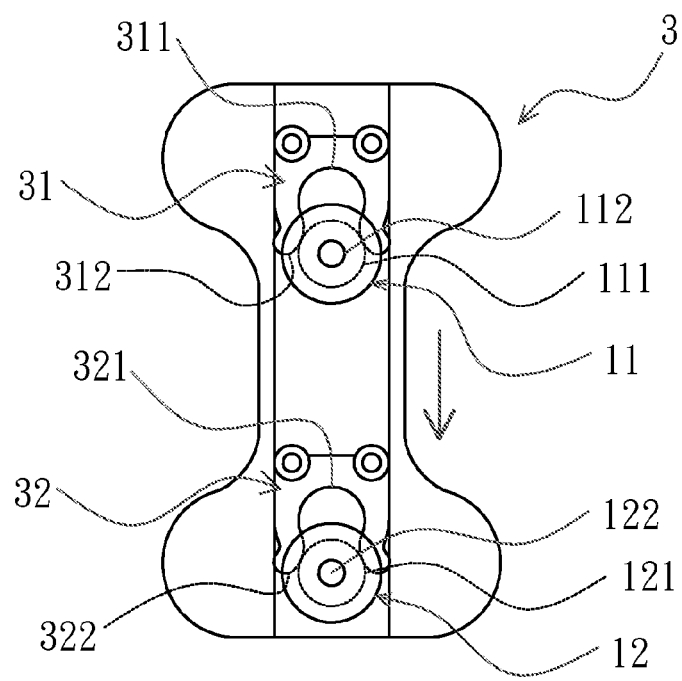
FIG. 3A is a schematic view of the fastening device for the bicycle according to the first embodiment of the present invention during the installation.

Referring to FIG. 3A, in the first embodiment of the present invention, a schematic view of the fastening device for the bicycle according to the first embodiment of the present invention during the installation is illustrated, wherein the direction thereof is from the frame 5 to the fastening device for the bicycle, while the frame 5 is omitted. The first movable socket 31 and the second movable socket 32 of the fastening assembly 3 are preferably made of abrasion-proof tough material, such as metal or engineering plastic. In the embodiment, the opening of the horseshoe-shape portion 311 of the first movable socket 31 faces downward, while the opening of the horseshoe-shape portion 321 of the second movable socket 32 also faces downward. In installation, the fastening assembly 3 is moved toward the fixed assembly 1 from top to bottom, so that the opening of the horseshoe-shape portion 311 of the first movable socket 31 of the fastening assembly 3 is disposed over the groove 111 of the first fixed holder 11, and the opening of the horseshoe-shape portion 321 of the second movable socket 32 is disposed over the groove 121 of the second fixed holder 12.

Referring to FIG. 3A, because the opening of the horseshoe-shape portion 311 of the first movable socket 31 is smaller than the diameter of the groove 111 and the opening of the horseshoe-shape portion 321 of the second movable socket 32 is smaller than the diameter of the groove 121, the guiding portions 312 of the first movable socket 31 can engage with the groove 111 of the first fixed holder 11, and the guiding portions 322 of the second movable socket 32 can engage with the groove 121 of the second fixed holder 12. However, when the fastening assembly 3 continuously abuts downward, the opening of the horseshoe-shape portion 311 of the first movable socket 31 and the opening of the horseshoe-shape portion 321 of the second movable socket 32 will be elastically expanded.

Figure 3B:
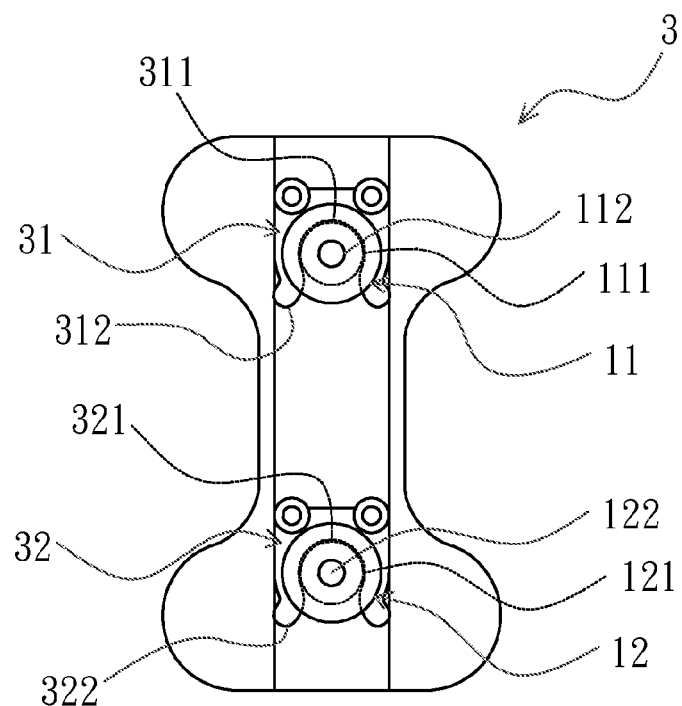
FIG. 3B is a schematic view of the fastening device for the bicycle according to the first embodiment of the present invention after the installation.

Then, referring to FIG. 3B, a schematic view of the fastening device for the bicycle according to the first embodiment of the present invention after the installation is illustrated, wherein the viewing direction thereof is from the frame to the fastening device for the bicycle, while the frame 5 is omitted. When the opening of the horseshoe-shape portion 311 of the first movable socket 31 and the opening of the horseshoe-shape portion 321 of the second movable socket 32 are temporarily expanded, the horseshoe-shape portion 311 of the first movable socket 31 and the horseshoe-shape portion 321 of the second movable socket 32 can be engaged into the groove 111 of the first fixed holder 11 and the groove 121 of the second fixed holder 12, so as to engage with each other. Thus, the fastening assembly 3 will not be separated from the fixed assembly 1. Besides, in the embodiment, except for applying an upward force to separate the fastening assembly 3 from fixed assembly 1, other side forces (such as downward, leftward, rightward and etc) can not separate the fastening assembly 3 from fixed assembly 1. Therefore, the fastening device for the bicycle can provide the detachably fastening function on the frame 5 of the bicycle. Furthermore, two sets of assembly structures can enhance the fastening strength for the object 7. Especially, the fastening strength of a normal column-shape object can be enhanced.

Furthermore, when it is unnecessary to install the object 7 (such as water bottle), only the two fixed holders 11, 12 with small volume are remained on the frame 3, the simplicity of the appearance of the bicycle will not be affected. Especially, the fastening device for the bicycle is suitably applied to a foldable bicycle. After detaching the fastening assembly 3, only the two fixed holders 11, 12 with small volume are remained on the frame of the foldable bicycle, so that the normally folding function of the foldable bicycle will not be interfered.

Figure 4A:
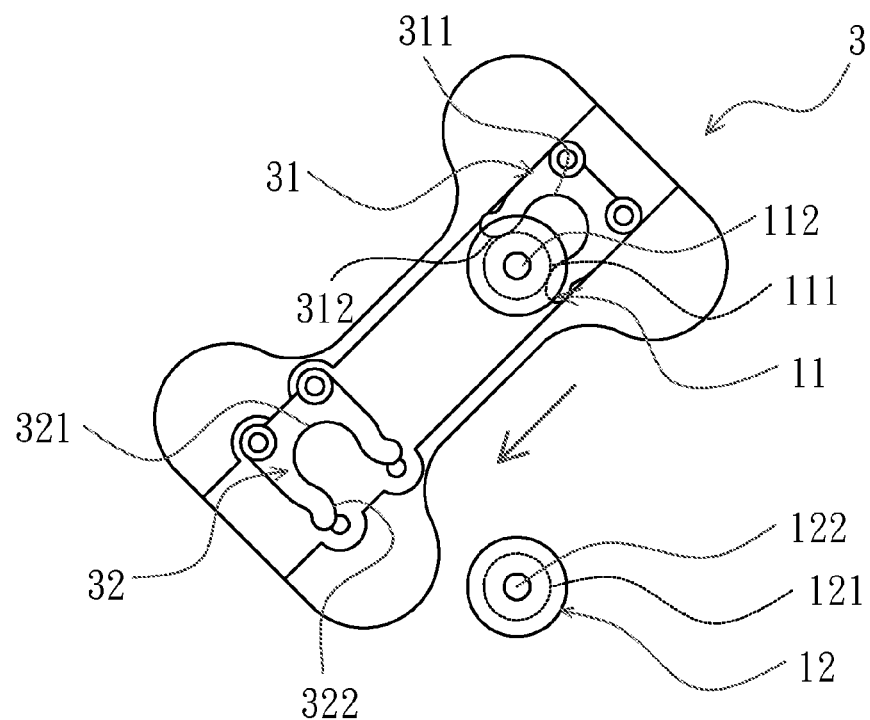
FIG. 4A is a schematic view of a fastening device for a bicycle according to a second embodiment of the present invention during the installation.
Figure 4B:
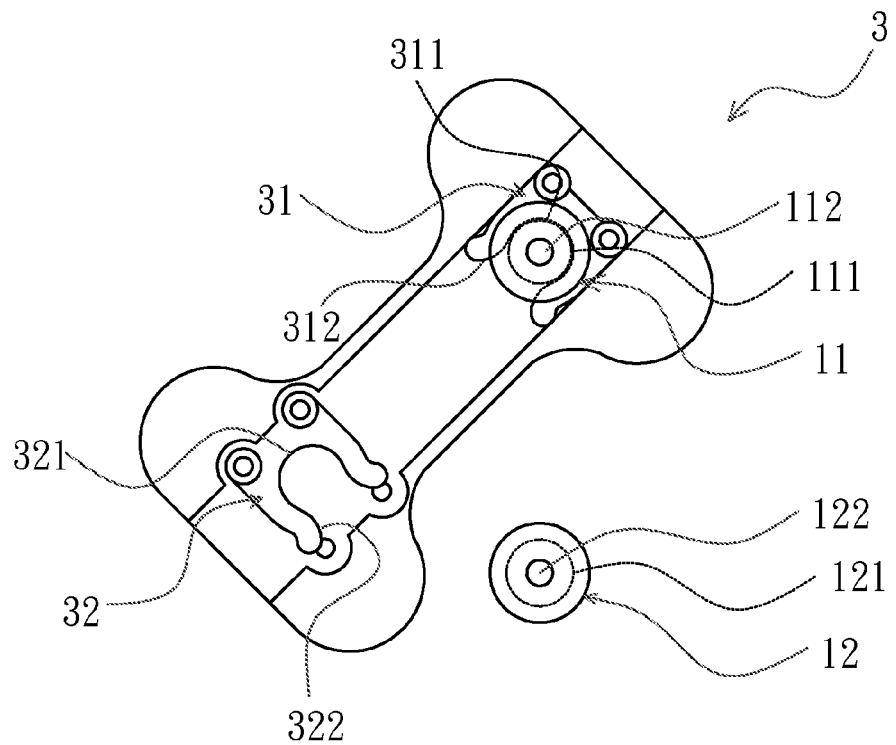
FIG. 4B is another schematic view of the fastening device for the bicycle according to the second embodiment of the present invention during the installation.

Referring to FIGS. 4A and 4B, schematic views of a fastening device for a bicycle according to a second embodiment of the present invention during the installation are illustrated, wherein the direction thereof is from the frame 5 to the fastening device for the bicycle, while the frame 5 is omitted. The second embodiment of the present invention is similar to the first embodiment of the present invention, and substantially uses reference numerals of the first embodiment, wherein the difference therebetween is that: the opening of the horseshoe-shape portion 311 of the first movable socket 31 still faces downward, but the opening of the horseshoe-shape portion 321 of the second movable socket 32 is change to face rightward or leftward. As shown in FIG. 4A, when installing the fastening assembly 3, a lower end of the fastening assembly 3 is firstly inclined to the left of the figure, and the horseshoe-shape portion 311 of the first movable socket 31 is inclined and engaged into the groove 111 of the first fixed holder 11 from the upper right to the lower left of the figure, to form an engagement connection.

Figure 4C:
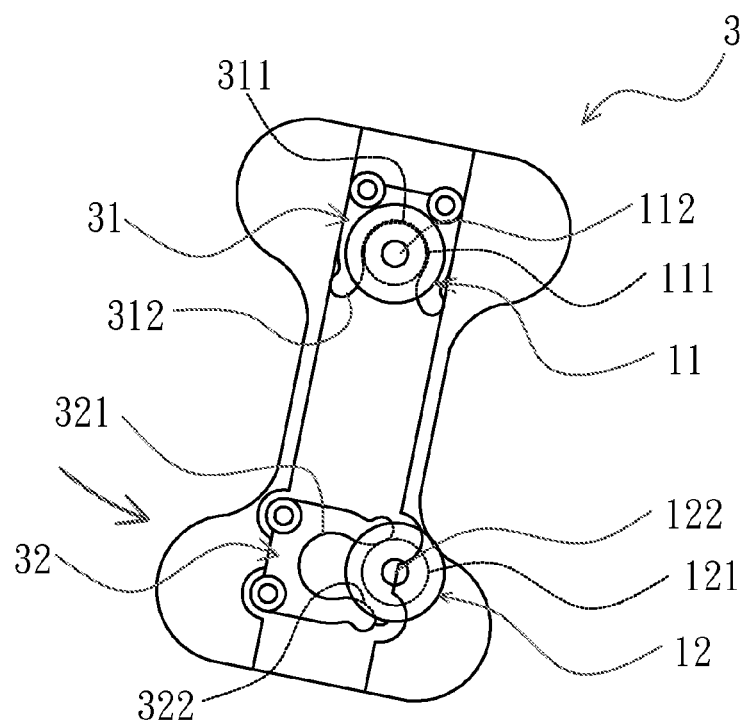
FIG. 4C is another schematic view of the fastening device for the bicycle according to the second embodiment of the present invention during the installation.
Figure 4D:
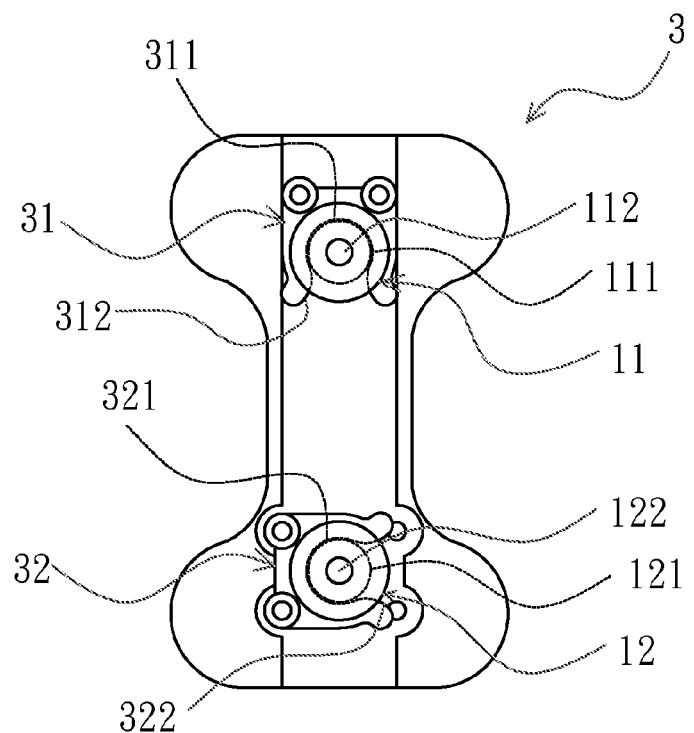
FIG. 4D is a schematic view of the fastening device for the bicycle according to the second embodiment of the present invention after the installation.

Referring to FIGS. 4C and 4D, schematic views of a fastening device for a bicycle according to a second embodiment of the present invention during and after the installation are illustrated, wherein the direction thereof is from the frame 5 to the fastening device for the bicycle, while the frame 5 is omitted. After the foregoing steps, the foregoing engaged first fixed holder 11 is used as a pivot point of rotation to rotate the fastening assembly 3 along a counterclockwise direction for moving the lower end of the fastening assembly 3 from the left to the right of the figure, so that the horseshoe-shape portion 321 of the second movable socket 32 is engaged into the groove 121 of the second fixed holder 12 to form an engagement connection. In such a way, the fastening assembly 3 will be not separated from the fixed assembly 1 outward. Even though a force from other directions (such as upper, lower, left, right or inclined direction) is applied, the fastening assembly 3 is uneasy to be entirely separated from the fixed assembly 1 because the opening of the horseshoe-shape portion 311 of the first movable socket 31 of the fastening assembly 3 is vertical to the opening of the horseshoe-shape portion 321 of the second movable socket 32.

In the second embodiment of the present invention, the fastening device for the bicycle can surely provide the detachably fastening function on the frame 5 of the bicycle, and can further enhance the fastening strength for the object 7. In addition, when it needs to take the fastening assembly 3, the foregoing installation steps can be reversely executed, as follows: the first fixed holder 11 is used as a pivot point of rotation to rotate the fastening assembly 3 along a clockwise direction for separating the second movable socket 32 on the lower end of the fastening assembly 3 from the second fixed holder 12 from the right to the left of the figure. Then, the fastening assembly 3 is forced from the lower left to the upper right to separate the first movable socket 31 from the first fixed holder 11, so that the fastening assembly 3 can be taken from the frame 5. The two-step operation not only can enhance the strength of fastening the fastening assembly 3 on the frame 5, but also can be carried out by a single hand. Further, the direction of the opening of the second movable socket 32 on the lower end of the fastening assembly 3 can be adjusted according to the individual favorite and habit of a bicycle rider, such as the opening of the horseshoe-shape portion 321 faces leftward.

As described above, in the first embodiment of the present invention, the direction of the opening of the first movable socket 31 is the same as the direction of the opening of the second movable socket 32. In the second embodiment of the present invention, the direction of the opening of the first movable socket 31 is different from (vertical to) the direction of the opening of the second movable socket 32. However, the present invention is not limited thereto. The direction of the opening of the first movable socket 31 and the direction of the opening of the second movable socket 32 can be arrangement combinations of any directions, only if the engagement connection between the first movable socket 31 and the first fixed holder 11 and the engagement connection between the second movable socket 32 and the second fixed holder 12 can be simultaneously done or done in turn.

Figure 5:
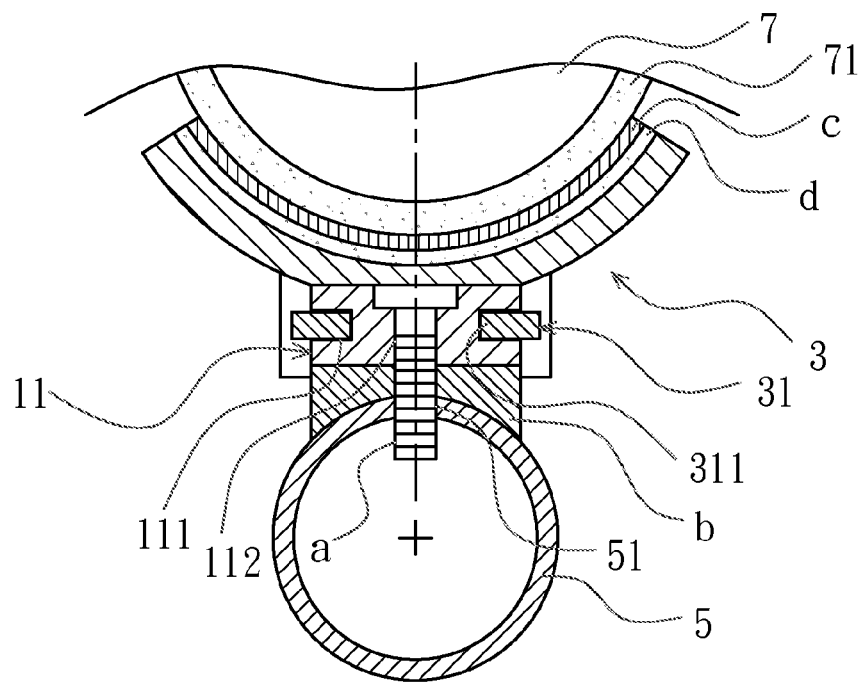
FIG. 5 is a partially cross-sectional view of a fastening device for a bicycle according to a third embodiment of the present invention.

Referring now to FIG. 5, a partially cross-sectional view of a fastening device for a bicycle according to a third embodiment of the present invention is illustrated. The third embodiment of the present invention is similar to the first embodiment of the present invention, and substantially uses reference numerals of the first embodiment, wherein the difference therebetween is that: the fastening device for the bicycle further comprises an object 7, such as a water bottle. The object 7 has a sheath 71, and one side of the sheath 71 has a first hook and loop fastener "c", i.e. a first connection element. Further, the fastening assembly 3 is a curved plate corresponding to the shape of the sheath 71, and a surface of the curved plate (i.e. the fastening assembly 3) facing the sheath 71 is provided with a second hook and loop fastener "d", i.e. a second connection element, wherein the first hook and loop fastener "c" is correspondingly connected to the second hook and loop fastener "d", so that the fastening assembly 3 and the sheath 71 can be detachably connected to each other. Because the water bottle 7 will not wear against other elements (such as the frame 5) during taking or placing, it will not cause the wear of the surface material or printing portion of the water bottle 7, so that the texture and appearance of the water bottle 7 can be maintained.

As described above, the fastening assembly 3 is used to support an object 7, wherein the water bottle described in the fastening device for the bicycle of the third embodiment of the present invention is connected to the second hook and loop fastener "d" of the fastening assembly 3 by the first hook and loop fastener "c" of the sheath 71. In the third embodiment of the present invention, although the sheath 71 is firstly used to cover the object 7 (water bottle) and then connected to the fastening assembly 3, the present invention is not limited thereto. For example, the fastening assembly 3 may be used and connected with a receiving container (such as a tool box) or a rack (such as a too rack). Alternatively, the fastening assembly 3 is a container or a shelf itself. In addition, the object 7 (water bottle) can omit the sheath 71 and be directly attached with the first hook and loop fastener "a" to be connected with the second hook and loop fastener "d" of the fastening assembly 3. Besides, the water bottle 7 can be mounted on the fastening assembly 3 by a banding or retaining ring.

Figure 6:
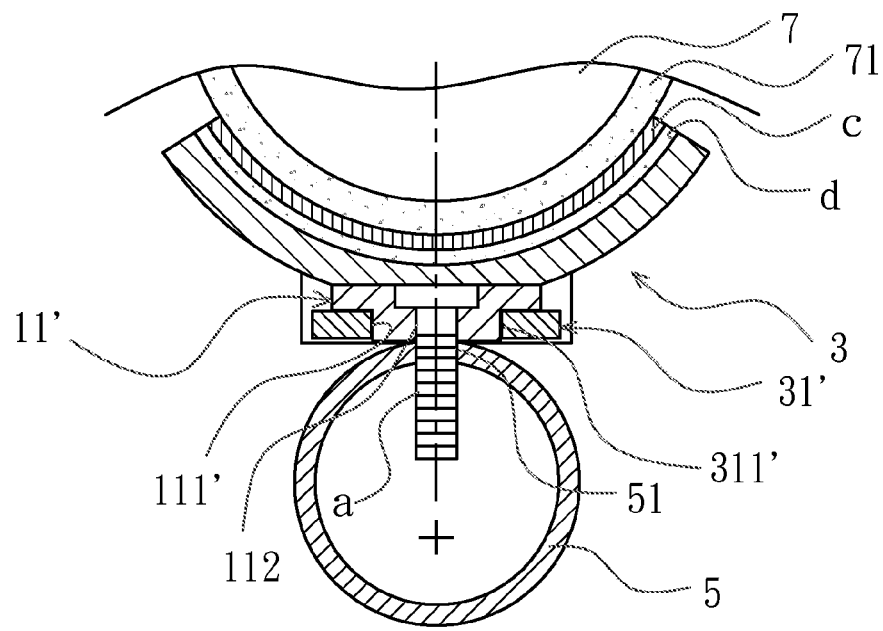
FIG. 6 is a partially cross-sectional view of a fastening device for a bicycle according to a fourth embodiment of the present invention.

Referring now to FIG. 6, a partially cross-sectional view of a fastening device for a bicycle according to a fourth embodiment of the present invention is illustrated, wherein the fourth embodiment of the present invention is similar to the third embodiment of the present invention, and substantially uses reference numerals of the third embodiment, wherein the difference therebetween is that: the first fixed holder 11 and the second fixed holder 12 of the fastening assembly 3 have different cross-sectional shape, and are not mounted with the fixed washer "b". As shown in FIG. 5, in the third embodiment of the present invention, according to the cross-sectional shape of the first fixed holder 11 and the second fixed holder 12, the groove 111 and 121 are formed on a central portion of the periphery thereof, so that the cross-sectional shape thereof is substantially a H shape; As shown in FIG. 6, in the fourth embodiment of the present invention, according to the cross-sectional shape of the first fixed holder 11' and the second fixed holder (not shown), the groove 111' is formed on one side of the periphery close to the frame 5, so that the cross-sectional shape thereof is substantially a T shape. Thus, similarly, the groove 111' can be engaged with a horseshoe-shape portion 311' of a first movable socket 31'. Therefore, the fourth embodiment of the present invention can reduce the thickness of the first fixed holder 11', the second fixed holder (not shown), the corresponding first movable socket 31' and the corresponding second movable socket 32.

Figure 7:
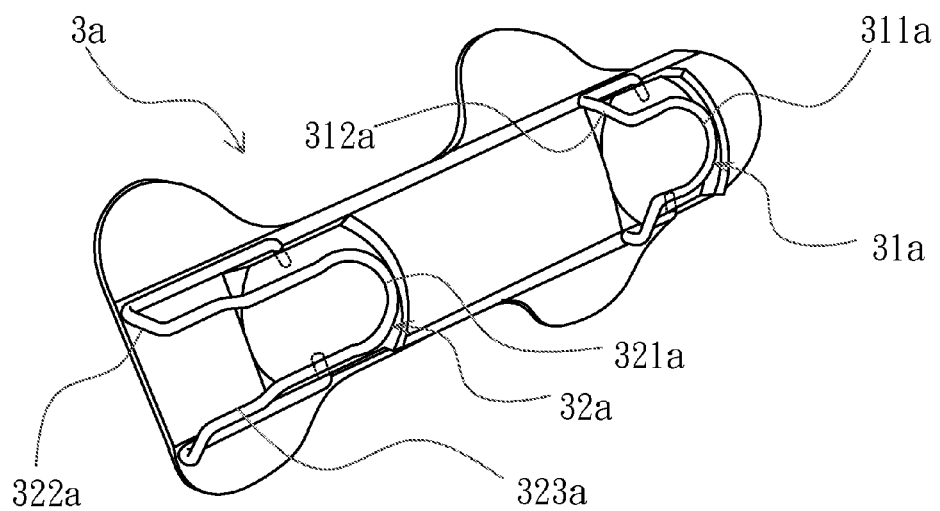
FIG. 7 is a perspective view of a fastening assembly of a fastening device for a bicycle according to a fifth embodiment of the present invention.

Referring now to FIG. 7, a perspective view of a fastening assembly of a fastening device for a bicycle according to a fifth embodiment of the present invention is illustrated, wherein the fifth embodiment of the present invention is similar to the first embodiment of the present invention, wherein the difference therebetween is that: a fastening assembly 3a comprises a first movable socket 31a and a second movable socket 32a, each of which is carried out by a one-piece bent frame. The profile of the first movable socket 31a and that of the second movable socket 32a are different. As shown in FIG. 7, each of the first movable socket 31a and the second movable socket 32a is substantially a main structure of continuous W-shape bent frame which is preferably made of metal material having strength and elasticity, such as aluminum. In the embodiment, the first movable socket 31a has a horseshoe-shape portion 311a and two guiding portions 312a, while the second movable socket 32a has a horseshoe-shape portion 321a, two guiding portions 322a and two guiding extension portions 323a, wherein the two guiding extension portions 323a are further formed between the horseshoe-shape portion 321a and the two guiding portions 322a for elongating a distance between the horseshoe-shape portion 321a and the two guiding portions 322a. Therefore, when installing the fastening assembly 3, the second movable socket 32a is firstly in contact with the second fixed holder 12. Then, the first movable socket 31 can be aligned with the first fixed holder 11 (as shown in FIG. 2) by the guidance of the two guiding extension portions 323a, so as to simultaneously finish the engagement operations. In another embodiment, the guiding extension portions (not shown) may be formed on the first movable socket 31a. In comparison with the first embodiment of the present invention which needs to simultaneously align the two movable sockets with the two fixed holders, the fifth embodiment of the present invention can generate a guidance function, so that the alignment operations of the two movable sockets and the two fixed holders can be done in turn and easily carried out.

Figure 8A:
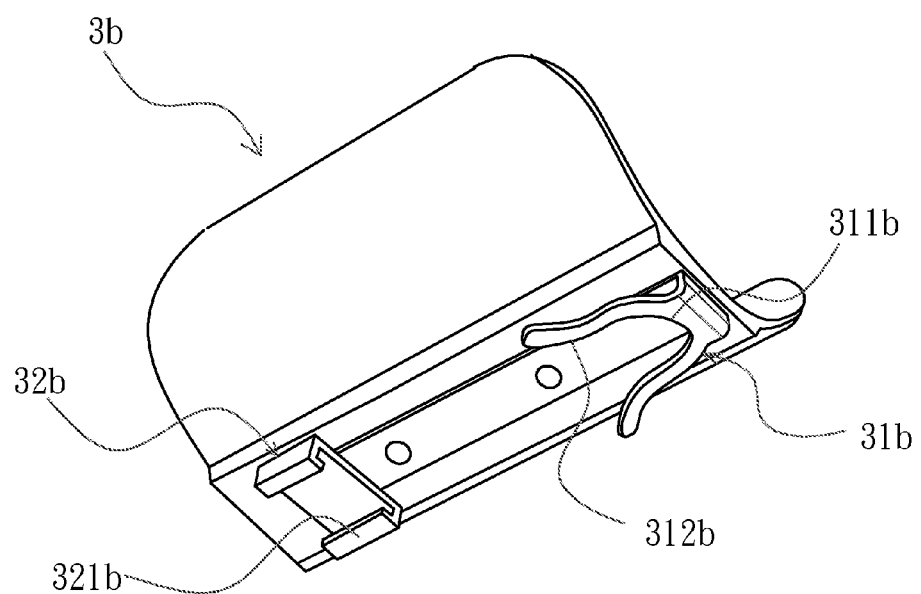
FIG. 8A is a perspective view of a fastening assembly of a fastening device for a bicycle according to a sixth embodiment of the present invention.

Referring now to FIG. 8A, a perspective view of a fastening assembly of a fastening device for a bicycle according to a sixth embodiment of the present invention is illustrated, wherein the sixth embodiment of the present invention is similar to the first embodiment of the present invention, wherein the difference therebetween is that: a fastening assembly 3b comprises a first movable socket 31b and a second movable socket 32b, each of which is carried out by a plate. The profile of the first movable socket 31b and that of the second movable socket 32b are different. As shown in FIG. 8A, the first movable socket 31b is similar to the first movable socket 31 of the first embodiment of the present invention, wherein the first movable socket 31b has a horseshoe-shape portion 311b and two guiding portions 312b for providing a function for engaging and connecting with the first fixed holder 11 (as shown in FIG. 2). But, the second movable socket 32b is formed with two flange s321b which are bent from an outer portion to an inner portion by punching, wherein the second movable socket 32b can be inserted into the groove 121 of the second fixed holder 12 (as shown in FIG. 2) to generate a retaining function. Because the first movable socket 31 can engage and connect with the first fixed holder 11 and the second movable socket 32b can be retained in the second fixed holder 12, the fastening assembly 3b can fixedly mounted on the fixed assembly 1. In another embodiment, the two flanges (not shown) may be formed on the first movable socket 31b. Thus, in various embodiments of the present invention, the two sets of the fixed holders and the movable socket are not limited to have the same type, size and function.

Figure 8B:
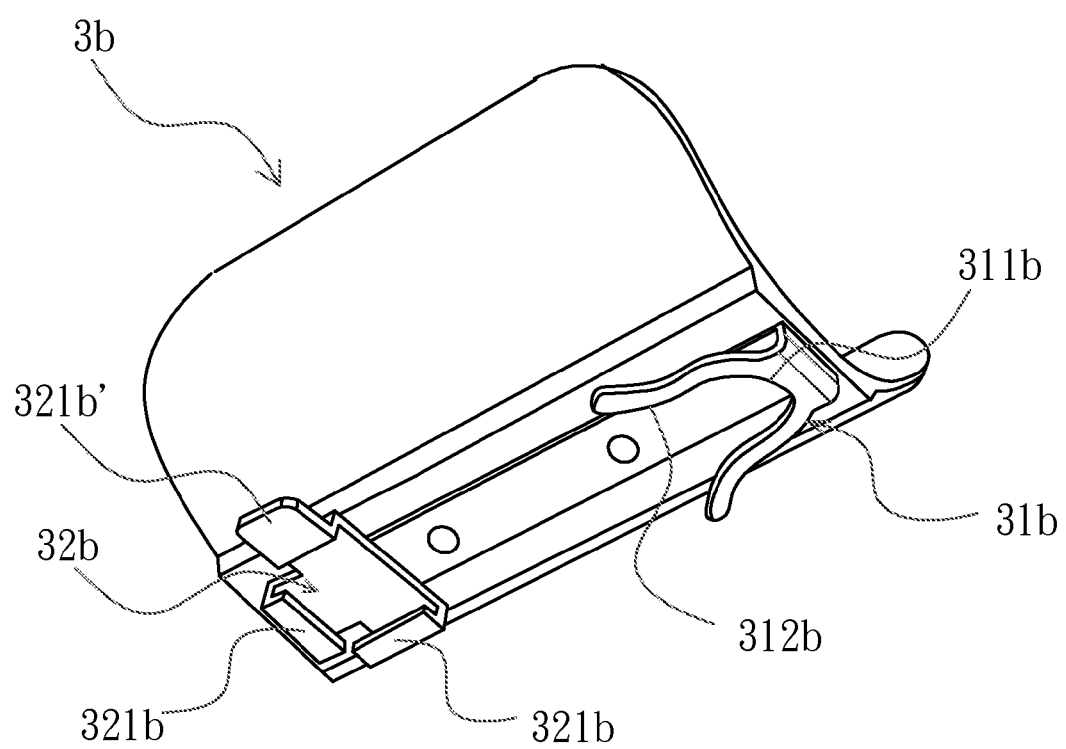
FIG. 8B is a perspective view of a fastening assembly of a fastening device for a bicycle according to a seventh embodiment of the present invention.

Referring now to FIG. 8B, a perspective view of a fastening assembly of a fastening device for a bicycle according to a seventh embodiment of the present invention is illustrated, wherein the seventh embodiment of the present invention is similar to the sixth embodiment of the present invention, wherein the difference therebetween is that: the profile of the second movable socket 32b is different. As shown in FIG. 8B, the second movable socket 32b is formed with two flanges 321b which are bent from an outer portion to an inner portion by punching and the two flanges 321b is formed on one side edge and a lower edge thereof. Meanwhile, the second movable socket 32b is formed with an outer flange 321b' which are bent from an outer portion to an inner portion by punching and the outer flanges 321b' is formed on the other side edge thereof. The outer flanges 321b' can provide an elastic engagement function. Thus, the seventh embodiment of the present invention can use an operation mode similar to the second embodiment of the present invention in FIGS. 4A to 4C. Firstly, the horseshoe-shape portion 311b of the first movable socket 31b of the fastening assembly 3b can be engaged into the groove 111 of the first fixed holder 11 (not shown) to form an engagement connection. Then, the first movable socket 31b is used as a pivot point of rotation to rotate the fastening assembly 3b for engaging the second movable socket 32 on the lower end of the fastening assembly 3b into the second fixed holder 12 (not shown) to form a retaining engagement connection, wherein the outer flanges 321b' has the engagement function to fixedly mount the fastening assembly 3b on the fixed assembly 1.

Figure 9A:
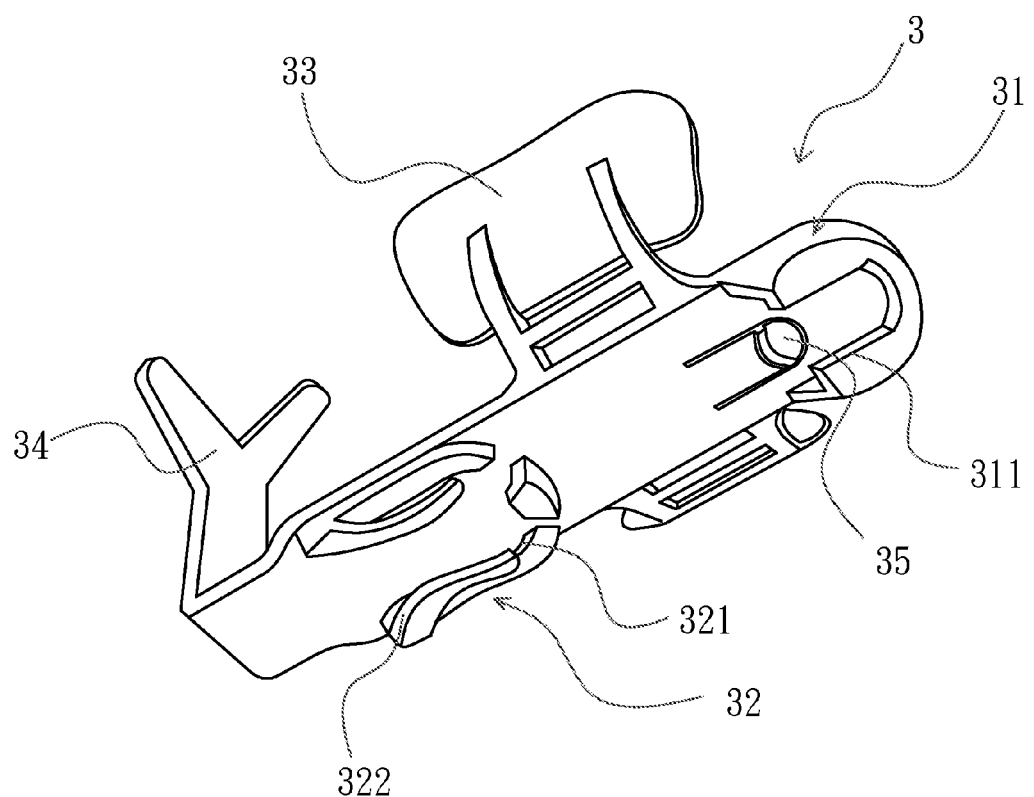
FIG. 9A is a perspective view of a fastening assembly of a fastening device for a bicycle according to an eighth embodiment of the present invention.
Figure 9B:
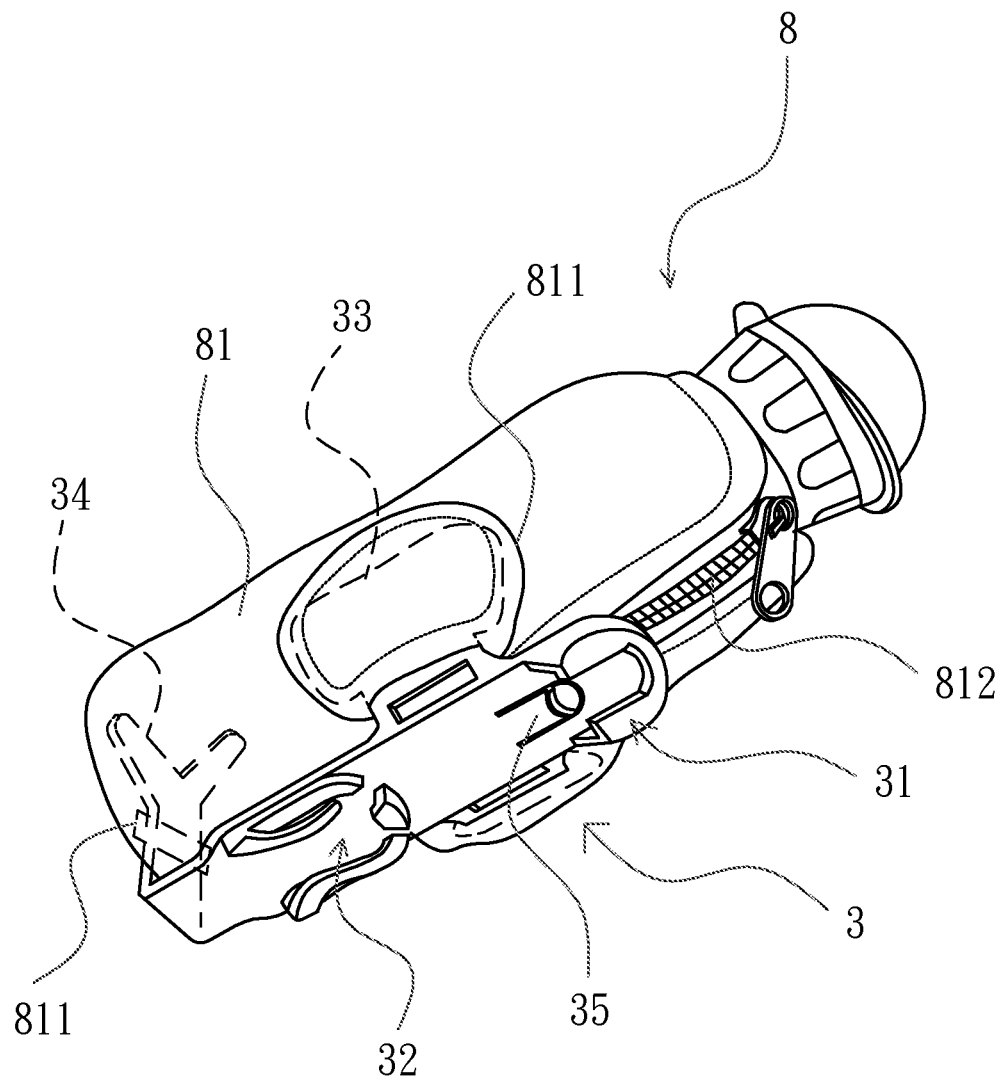
FIG. 9B is a perspective view of the assembly device of the fastening device for the bicycle according to the eighth embodiment of the present invention.

Referring to FIGS. 9A and 9B, perspective view of a fastening assembly of a fastening device for a bicycle according to an eighth embodiment of the present invention are illustrated, wherein the eighth embodiment of the present invention is similar to the first embodiment of the present invention, and substantially uses reference numerals of the first embodiment, wherein the difference of the eighth embodiment is that: the opening of the horseshoe-shape portion 311 of the first movable socket 31 and the opening of the horseshoe-shape portion 321 of the second movable socket 32 face downward. Except for the horseshoe-shape portion 321, the second movable socket 32 further has a guiding portion 322. As shown in FIG. 9B, the fastening assembly 3 is used to support a water bottle 8, and the fastening assembly 3 comprises two wing plates 33 symmetrically arranged on sides of the water bottle 8 and having a curved profile corresponding to the water bottle. Preferably, a width of an outer end of the two wing plates 33 is greater than that of an inner end thereof. The fastening assembly 3 further comprises a bottom plate 34 for supporting a bottom of the water bottle 8, and the bottom plate 34 is substantially Y-shape, but not limited thereto. A bottom of the first movable socket 31 comprises an engagement projection 35 for engaging the first fixed holder 11 (not shown) into the first movable socket 31.

Furthermore, the water bottle 8 further comprises a bottle sheath 81, and the sheath 81 is preferably made of water-proof and thermal-insulation soft material. The water bottle 8 is received in the bottle sheath 81; and the bottle sheath 81 comprises two inserted portions 811, wherein the two inserted portions 811 are substantially pocket-like, and can be inserted by the two wing plates 33, so that the bottle sheath 81 can be connected to the fastening assembly 3. Moreover, the bottle sheath 81 can have another inserted portion 811 corresponding to the bottom plate 34, wherein the inserted portion 811 is substantially belt-like, and can be inserted by the a root portion of the bottom plate 34, so that a bottom of the bottle sheath 81 can be connected to the fastening assembly 3. In addition, the bottle sheath 81 has an opening for exposing an opening of the water bottle 8, so that a user can conveniently use the water bottle 8. The bottle sheath 81 further comprises a zipper 812 for conveniently taking the water bottle 8 from the bottle sheath 81 and placing the water bottle 8 into the bottle sheath 81. As described above, the bottle sheath 81 can generate a function of protecting the water bottle 8 from being worn and generate a thermal insulation effect.

Figure 9C:
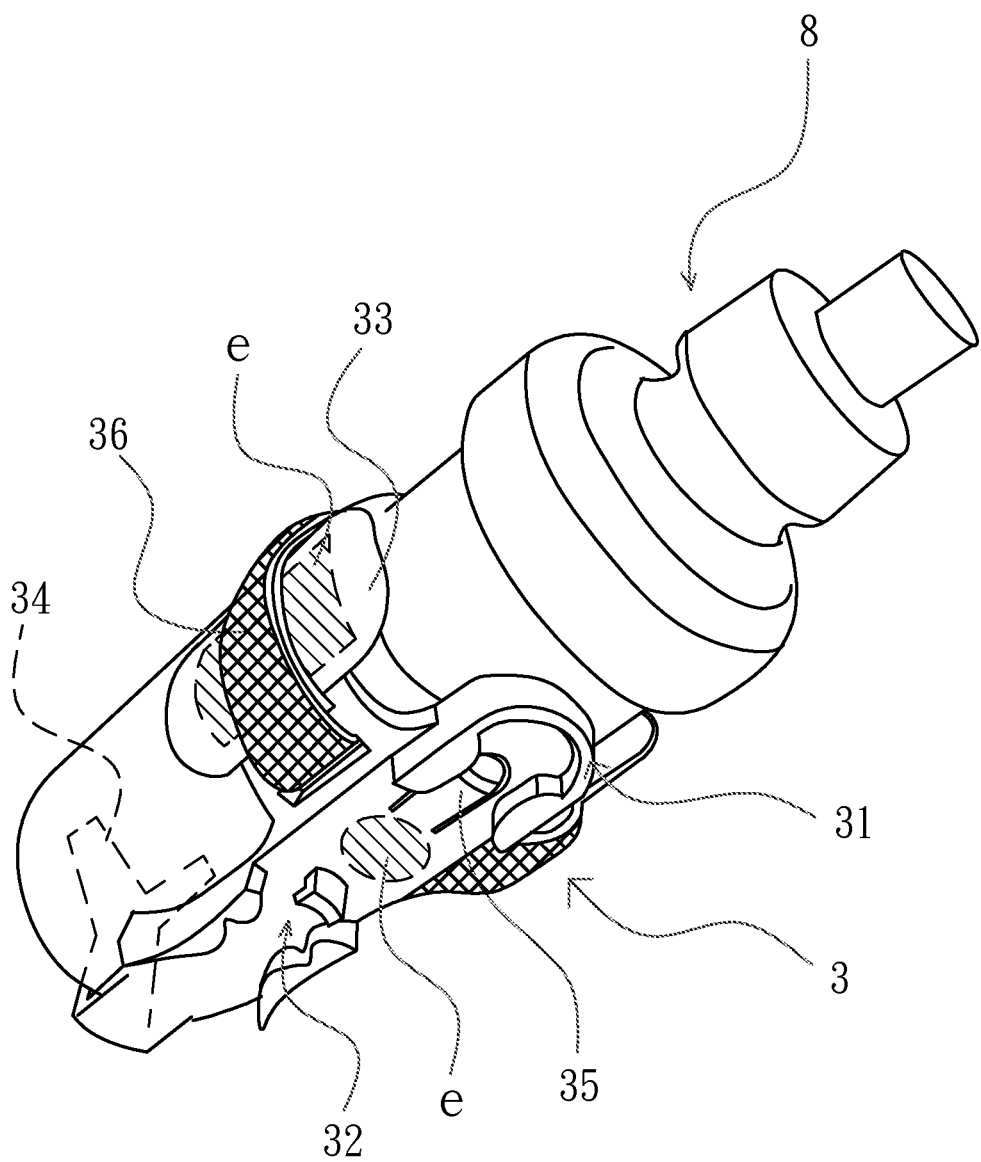
FIG. 9C is a perspective view of a fastening assembly of a fastening device for a bicycle according to a ninth embodiment of the present invention.

Referring to FIG. 9C, a perspective view of a fastening assembly of a fastening device for a bicycle according to a ninth embodiment of the present invention is illustrated, wherein the ninth embodiment of the present invention is similar to the eighth embodiment of the present invention, and substantially uses reference numerals of the eighth embodiment, wherein the difference therebetween is that: the two wing plates 33 further have a banding 36, and the two wing plates 33 are formed with a plurality of slots (unlabeled), respectively, for the banding 36 to pass therethrough. The banding 36 can be detachably tied between the two wing plates 33 by using hook and loop fasteners, retaining rings or other elements. Therefore, the water bottle 8 can be directly mounted on the fastening assembly 3 by the banding 36. Besides, in consideration of the anti-skid and scratch-resistant properties of the contact area between the fastening assembly 3 and the water bottle 8, a soft cushion can be further disposed on a suitable position of the contact area between the fastening assembly 3 and the water bottle 8.

Figure 10A:
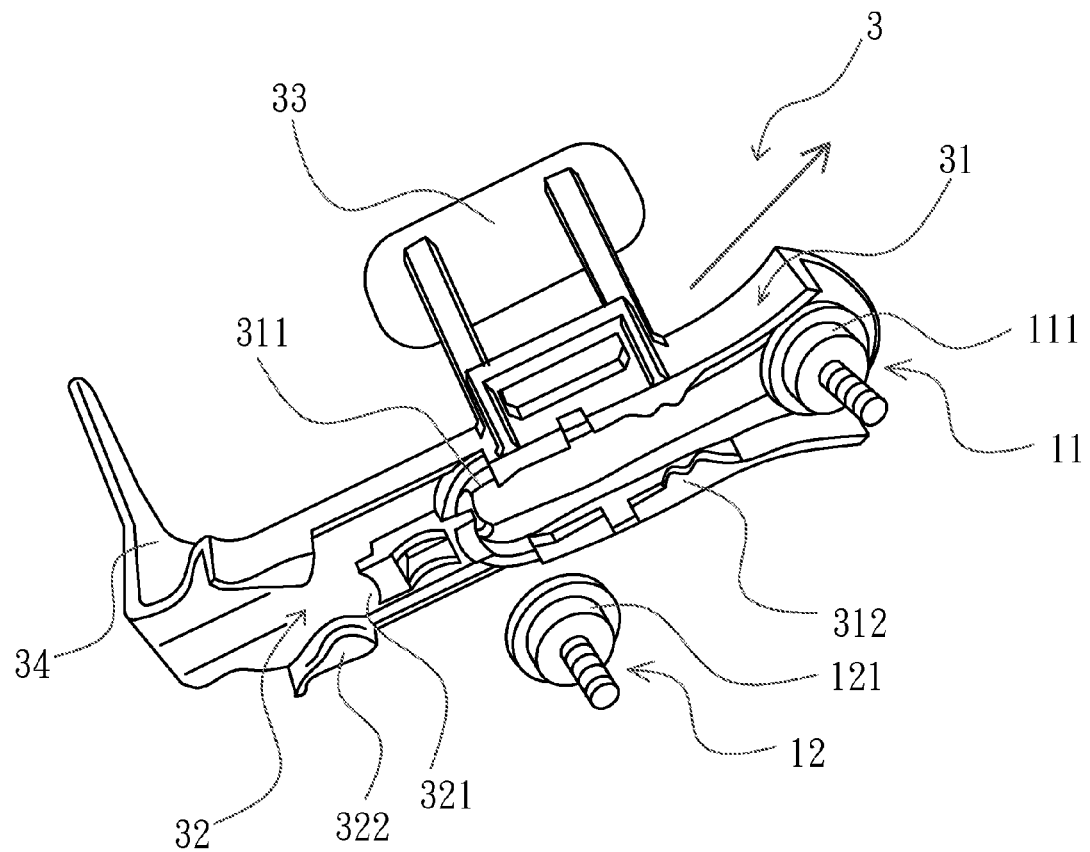
FIG. 10A is a schematic view of a fastening device for a bicycle according to a tenth embodiment of the present invention during the installation.
Figure 10B:
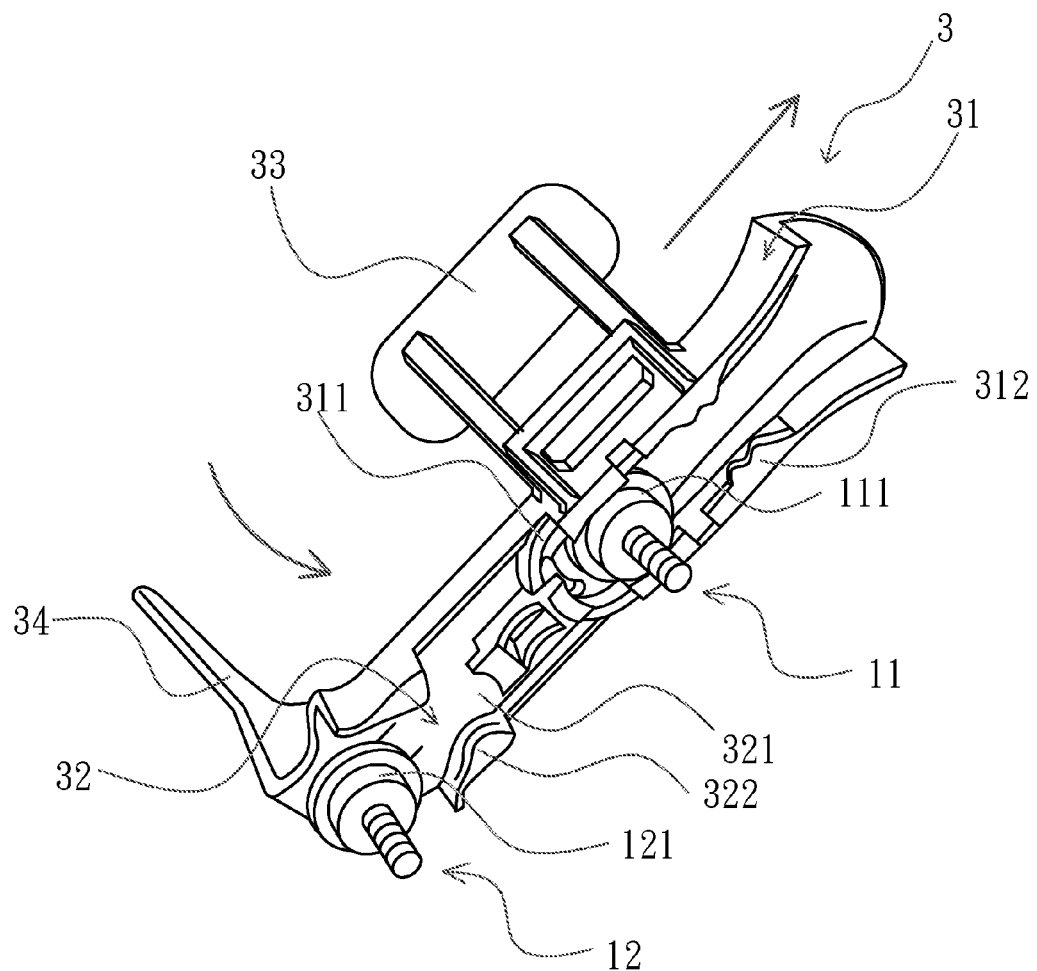
FIG. 10B is another schematic view of the fastening device for the bicycle according to the tenth embodiment of the present invention during the installation.
Figure 10C:
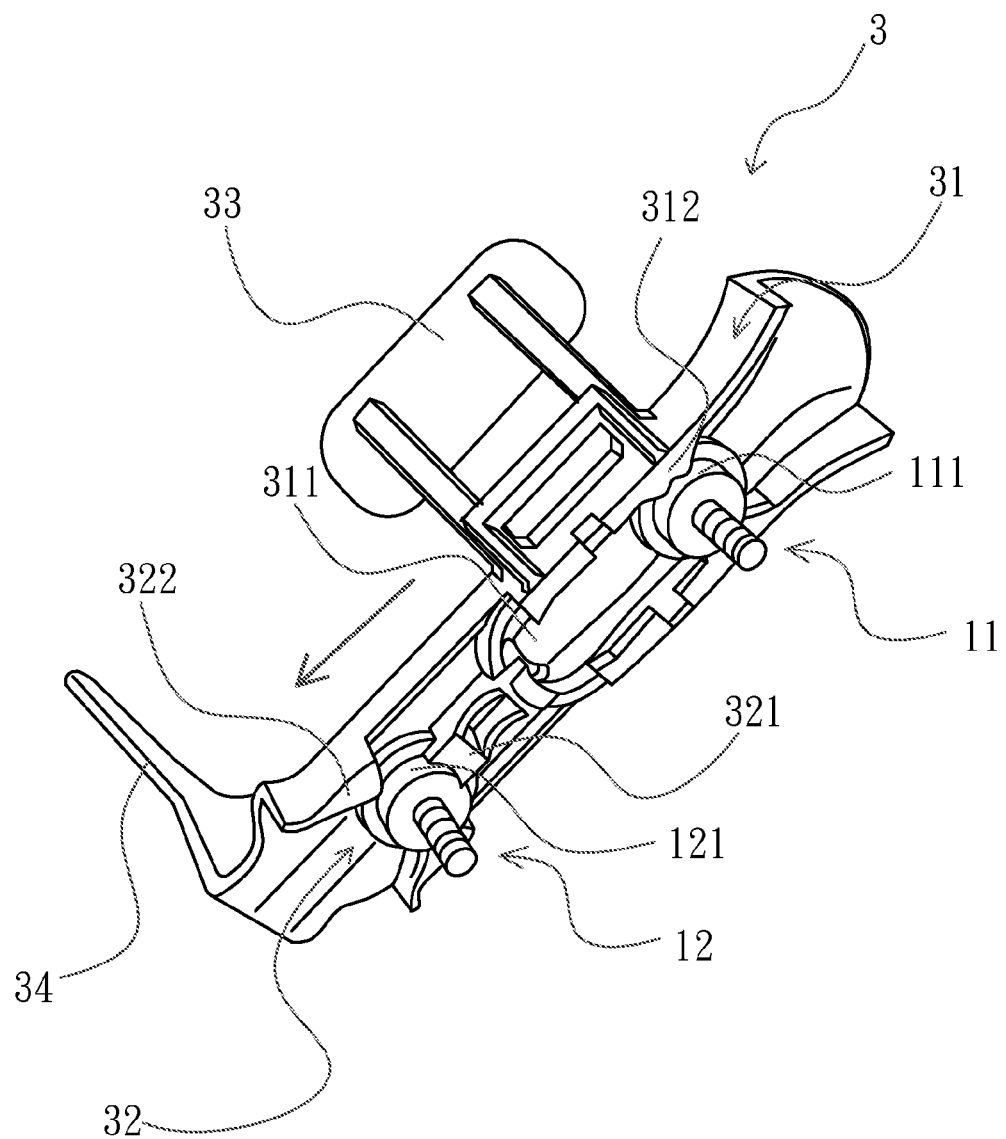
FIG. 10C is another schematic view of the fastening device for the bicycle according to the tenth embodiment of the present invention during the installation.

Referring to FIGS. 10A to 10C, schematic views of a fastening device for a bicycle according to a tenth embodiment of the present invention during the installation are illustrated, wherein the direction thereof is a perspective inclined direction from the frame 5 to the fastening device for the bicycle, while the frame 5 is omitted. The tenth embodiment of the present invention is similar to the first and eighth embodiment of the present invention, and substantially uses reference numerals of the first and eighth embodiment, wherein the difference of the tenth embodiment is that: the opening of the horseshoe-shape portion 311 of the first movable socket 31 of the fastening assembly 3 faces upward, while the opening of the horseshoe-shape portion 321 of the second movable socket 32 faces downward. Except for the horseshoe-shape portion 311, the first movable socket 31 further has a guiding portion 312. As shown in FIGS. 10A to 10C, an installation operation between the first movable socket 31 and the second movable socket 32 of the fastening assembly 3 and the first fixed holder 11 and the second fixed holder 12 of the fixed assembly 1 is illustrated.

Firstly, as shown in FIG. 10A, a front end of the fastening assembly 3 is lowered and a rear end thereof is raised to be in an inclined state, and then the fastening assembly 3 moves toward the fixed assembly 1 from the top to the bottom, so that the opening of the horseshoe-shape portion 311 of the first movable socket 31 close to the front end of the fastening assembly 3 is located below the groove 111 of the first fixed holder 11. Meanwhile, the second movable socket 32 on the rear end of the fastening assembly 3 is located at a position higher than the height of the second fixed holder 12 without any contact therebetween.

Then, as shown in FIG. 10B, the first movable socket 31 of the fastening assembly 3 continues to be moved upward along the groove 111 of the first fixed holder 11, while the first fixed holder 11 correspondingly passes through the opening of the horseshoe-shape portion 311 and the guiding portions 312 of the first movable socket 31 in turn until abutting against a lower end of the horseshoe-shape portion 311 of the first movable socket 31. At that time, the second movable socket 32 on the rear end of the fastening assembly 3 is lowered to a position equal to the height of the second fixed holder 12, and the opening of the horseshoe-shape portion 321 of the second movable socket 32 is located above the groove 121 of the second fixed holder 12.

Finally, as shown in FIG. 10C, the horseshoe-shape portion 321 of the second movable socket 32 is engaged into the groove 121 of the second fixed holder 12 downward to form an engagement connection. Meanwhile, the first movable socket 31 is lowered a distance, but the first fixed holder 11 is relatively raised a distance and stopped at the guiding portions 312 of the first movable socket 31, so that the first movable socket 31 will not be separated from the first fixed holder 11. Thus, the fastening assembly 3 is fastened on the fixed assembly 1 without outward separation. When the fastening assembly 3 is fastened on the fixed assembly 1, the guiding portions 312 of the first movable socket 31 where the first fixed holder 11 is stopped is preferably an engagement portion, so as to strengthen the fastening effect of the fastening assembly 3.

On the other hand, when it needs to detach the fastening assembly 3 from the fixed assembly 1, the foregoing steps can be reversely executed, and the operation is very simple. In addition, the guiding portions 312 of the first movable socket 31 of the fastening assembly 3 has a suitable length design according to the size and distance of the first fixed holder 11 and the second fixed holder 12 of the fixed assembly 1. When the second movable socket 32 is engaged with the second fixed holder 12, the first movable socket 31 will not be separate from the first fixed holder 11. As described above, in comparison with the traditional fastening device for the bicycle (especially, a bottle cage) which may cause the wear of the material or printing on the surface of the water bottle due to the vibration or taking operation during riding the bicycle, may affect the simplicity of the appearance of the bicycle when it is unnecessary to mount the water bottle or may be unsuitable for a foldable bicycle, the fastening device for the bicycle of the present invention as shown in FIG. 2 can prevent the surface of the water bottle from being worn and can enhance the fastening strength and the detachment convenience thereof. In addition, the fastening device for the bicycle can be replaced by other tool box or tool rack, so as to add the function of the bicycle.

What is claimed is:
1. A fastening device for a bicycle, wherein the fastening device for the bicycle comprises:
 a fixed assembly having:
  a first fixed holder mounted on a frame; and
  a second fixed holder mounted on the frame and being apart from the first fixed holder a distance; and
 a fastening assembly for supporting a water bottle, and the fastening assembly having:
  a first movable socket detachably engaged into the corresponding first fixed holder; and a second movable socket detachably engaged into the corresponding second fixed holder;

wherein each of the first fixed holder and the second fixed holder has a profile of a pulley having a groove on a periphery of the pulley;

wherein each of the first movable socket and the second movable socket has a horseshoe-shape portion having an opening, wherein the horseshoe-shape portion is used for correspondingly engaging into the groove of the first fixed holder or the second fixed holder, and two guiding portions formed on two ends of the opening of the horseshoe-shape portion for guiding the horseshoe-shape portion to engage into the groove of the first fixed holder or the second fixed holder; and wherein an inner diameter of the horseshoe-shape portion of the first or second movable socket is substantially equal to a diameter of the groove of the first or second fixed holder, and a width of the opening of the horseshoe-shape portion is smaller than the inner diameter of the horseshoe-shape portion;

wherein the fastening assembly comprises two wing plates symmetrically arranged on sides of the water bottle and having a curved profile corresponding to the water bottle; and a width of an outer end of the two wing plates is greater than that of an inner end thereof, and the water bottle further comprises a sheath in which the water bottle is received; and wherein the sheath comprises two inserted portions, and the two inserted portions can be inserted by the two wing plates, so that the sheath can be connected to the fastening assembly.

2. The fastening device for a bicycle according to claim 1, wherein two guiding extension portions are further formed between the horseshoe-shape portion and the guiding portions of the second movable socket for elongating a distance between the horseshoe-shape portion and the guiding portions.

3. The fastening device for a bicycle according to claim 1, wherein the second movable socket comprises two flanges for inserting into the groove of the second fixed holder.

4. The fastening device for a bicycle according to claim 1, wherein the opening of the horseshoe-shape portion of the first movable socket faces downward, and the opening of the horseshoe-shape portion of the second movable socket faces leftward or rightward.

5. The fastening device for a bicycle according to claim 1, wherein each of the first fixed holder and the second fixed holder further comprises a fixed washer disposed between each of the first and second fixed holders and the frame for filling a gap between each of the first and second fixed holders and a surface profile of the frame.

6. The fastening device for a bicycle according to claim 1, wherein a bottom of the first movable socket comprises an engagement projection for engaging the first fixed holder into the first movable socket.

7. The fastening device for a bicycle according to claim 1, wherein the two wing plates further have a banding for fastening the water bottle.

8. The fastening device for a bicycle according to claim 1, wherein the fastening assembly comprises a bottom plate for supporting a bottom of the water bottle, and the bottom plate is substantially Y-shape; and wherein the sheath has an inserted portion corresponding to the bottom plate, and the inserted portion can be inserted by the bottom plate, so that a bottom of the sheath can be connected to the fastening assembly.

9. The fastening device for a bicycle according to claim 1, wherein the sheath has an opening for exposing an opening of the water bottle, and comprises a zipper for conveniently taking the water bottle from the sheath and placing the water bottle into the sheath.

10. The fastening device for a bicycle according to claim 1, wherein the opening of the horseshoe-shape portion of the first movable socket faces downward, and the opening of the horseshoe-shape portion of the second movable socket faces downward.

11. The fastening device for a bicycle according to claim 1, wherein the opening of the horseshoe-shape portion of the first movable socket faces upward, and the opening of the horseshoe-shape portion of the second movable socket faces downward.

* * * * *